United States Patent
Yukie et al.

(10) Patent No.: US 10,148,802 B2
(45) Date of Patent: *Dec. 4, 2018

(54) TELEPHONY TERMINAL

(71) Applicant: CALLAHAN CELLULAR L.L.C., Wilmington, DE (US)

(72) Inventors: Satoru Yukie, Rancho Santa Fe, CA (US); Mike Kwon, San Diego, CA (US); Craig M. Hagopian, San Diego, CA (US); Kazuhiko Shirai, San Diego, CA (US)

(73) Assignee: CALLAHAN CELLULAR L.L.C., Wilmington, DE (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/232,803

(22) Filed: Aug. 9, 2016

(65) Prior Publication Data

US 2016/0352880 A1 Dec. 1, 2016

Related U.S. Application Data

(63) Continuation of application No. 14/187,126, filed on Feb. 21, 2014, now Pat. No. 9,420,110, which is a
(Continued)

(51) Int. Cl.
*H04M 7/00* (2006.01)
*H04M 1/253* (2006.01)
(Continued)

(52) U.S. Cl.
CPC .......... *H04M 1/2535* (2013.01); *H04L 12/66* (2013.01); *H04M 1/725* (2013.01); *H04M 1/738* (2013.01);
(Continued)

(58) Field of Classification Search
CPC ..... H04L 12/66; H04M 1/2535; H04M 1/725; H04M 1/738; H04M 7/0003; H04M 3/4938
(Continued)

(56) References Cited

U.S. PATENT DOCUMENTS 5,884,262 A    3/1999  Wise et al.
5,953,322 A *  9/1999  Kimball ............... H04M 1/2535
                                                    370/328
(Continued)

FOREIGN PATENT DOCUMENTS

WO    0075685    12/2000
WO    02058253    7/2002

OTHER PUBLICATIONS

Office Action dated Sep. 13, 2010 for U.S. Appl. No. 11/549,882, 11 pages.
(Continued)

*Primary Examiner* — Melur Ramakrishnaiah
(74) *Attorney, Agent, or Firm* — Amin, Turocy & Watson, LLP

(57) ABSTRACT

Methods and apparatus implementing a telephony terminal for connecting a telephone to a data network. In one implementation, a telephony system includes: a phone connection for connecting to a telephone; a network connection for connecting to a network; and a controller connected to said phone connection and to said network connection; wherein said controller provides a phone service for processing information for said phone connection, said controller provides a network service for processing information for said network connection, and said controller provides a network voice service for converting information to and from a network voice format.

20 Claims, 13 Drawing Sheets

Related U.S. Application Data continuation of application No. 13/113,810, filed on May 23, 2011, now Pat. No. 8,682,278, which is a continuation of application No. 11/549,882, filed on Oct. 16, 2006, now Pat. No. 7,995,987, which is a continuation of application No. 10/675,325, filed on Sep. 29, 2003, now Pat. No. 7,136,673.

(60) Provisional application No. 60/414,242, filed on Sep. 27, 2002, provisional application No. 60/454,464, filed on Mar. 13, 2003.

(51) Int. Cl.
| | |
|---|---|
| *H04L 12/66* | (2006.01) |
| *H04M 1/725* | (2006.01) |
| *H04M 1/738* | (2006.01) |
| *H04M 7/12* | (2006.01) |
| *H04M 3/493* | (2006.01) |

(52) U.S. Cl.
CPC ....... *H04M 7/0003* (2013.01); *H04M 7/0036* (2013.01); *H04M 7/0054* (2013.01); *H04M 7/1235* (2013.01); *H04M 7/1295* (2013.01); *H04M 3/4938* (2013.01)

(58) Field of Classification Search
USPC ........... 455/403, 556.1, 556.2, 557; 370/353, 370/356, 352, 355; 379/93.04, 221.11, 379/93.06, 207.01
See application file for complete search history.

(56) References Cited

U.S. PATENT DOCUMENTS

| | | | |
|---|---|---|---|
| 5,970,473 A | 10/1999 | Gerszberg et al. | |
| 6,275,707 B1 | 8/2001 | Reed et al. | |
| 6,295,293 B1 | 9/2001 | Toennby et al. | |
| 6,535,590 B2 | 3/2003 | Tidwell et al. | |
| 6,621,893 B2 | 9/2003 | Elzur | |
| 6,643,495 B1 | 11/2003 | Gallery et al. | |
| 6,697,892 B1 | 2/2004 | Laity et al. | |
| 6,738,382 B1 | 5/2004 | West et al. | |
| 6,882,709 B1 | 4/2005 | Sherlock et al. | |
| 6,901,271 B1 | 5/2005 | Cheah et al. | |
| 6,944,151 B1 | 9/2005 | Menard | |
| 6,952,414 B1 | 10/2005 | Willing | |
| 7,061,901 B1 | 6/2006 | Shnitzer et al. | |
| 7,197,029 B1 | 3/2007 | Osterhout et al. | |
| 7,382,786 B2 | 6/2008 | Chen et al. | |
| 7,831,208 B2 * | 11/2010 | Nelson | G06F 3/016 455/414.2 |
| 2001/0036844 A1 * | 11/2001 | Ishigaki | H04L 51/38 455/564 |
| 2002/0044149 A1 | 4/2002 | McCarthy et al. | |
| 2002/0048283 A1 * | 4/2002 | Lin | G06Q 30/02 370/495 |
| 2003/0163545 A1 | 8/2003 | Koskelainen et al. | |

OTHER PUBLICATIONS

Office Action dated Jul. 25, 2005 for U.S. Appl. No. 10/675,325, 15 pages.
Final Office Action dated Jan. 13, 2006 for U.S. Appl. No. 10/675,325, 19 pages.
Office Action dated Mar. 7, 2013 for U.S. Appl. No. 13/113,810, 19 pages.
Office Action dated Apr. 28, 2015 for U.S. Appl. No. 14/187,126, 20 pages.
Office Action dated Dec. 7, 2015 for U.S. Appl. No. 14/187,126, 9 pages.

* cited by examiner

TELEPHONY TERMINAL

This patent application is a continuation of, and claims priority to each of, U.S. patent application Ser. No. 14/187,126, filed Feb. 21, 2014 (issued as U.S. Pat. No. 9,420,110 on Aug. 16, 2016), and entitled "TELEPHONY TERMINAL," which is a continuation of U.S. patent application Ser. No. 13/113,810, filed May 23, 2011 (issued as U.S. Pat. No. 8,682,278 on Mar. 25, 2014), and entitled "TELEPHONY TERMINAL," which is a continuation of U.S. patent application Ser. No. 11/549,882, filed Oct. 16, 2006 (issued as U.S. Pat. No. 7,995,987 on Aug. 9, 2011), which is a continuation of U.S. patent application Ser. No. 10/675,325, filed Sep. 29, 2003 (issued as U.S. Pat. No. 7,136,673 on Nov. 14, 2006), which applications further claim priority to U.S. Provisional Appln. No. 60/414,242, filed Sep. 27, 2002 and U.S. Provisional Appln. No. 60/454,464, filed Mar. 13, 2003. The entireties of each of these listed applications are hereby incorporated by reference herein.

BACKGROUND

A typical analog telephone system sends and receives voice information to and from the PSTN (public switched telephone network) using a POTS (plain old telephone service) connection. An alternative approach for sending voice information has been developed using IP networks, sometimes referred to as VoIP (voice over IP). One common way to use VoIP is to provide voice information to a computer system (e.g., using a microphone) connected to the Internet. In one approach, the computer system converts the analog voice information to a digital data and sends the digital data as IP packets across the Internet to a recipient.

Some wireless handsets (e.g., some cell phones) provide both voice and data services through their corresponding wireless networks. The wireless handset establishes a wireless connection to the wireless network for transferring information and data. The wireless network is typically in turn connected to the PSTN and to the Internet. In this way, a user conducts voice calls through the wireless network and also can access data services such as e-mail or web browsing through the same wireless network.

SUMMARY

The present invention provides methods and apparatus implementing a telephony terminal for connecting a telephone to a data network. In one implementation, a telephony system includes: a phone connection for connecting to a telephone; a network connection for connecting to a network; and a controller connected to said phone connection and to said network connection; wherein said controller provides a phone service for processing information for said phone connection, said controller provides a network service for processing information for said network connection, and said controller provides a network voice service for converting information to and from a network voice format.

In another implementation, a method of sending data to a network includes: receiving information through a phone connection at a terminal, wherein said information indicates a service; preparing intermediate information based on said information according to said indicated service; preparing network data based on said intermediate information according to a network protocol for a network connected to said terminal; and sending said network data to said network.

In another implementation, a method of processing data from a network includes: receiving information through a network connection at a terminal, wherein said network connection is connected to a network and said information indicates a service; preparing intermediate information based on said information according to said indicated service; preparing phone information based on said intermediate information according to a protocol for a telephone connected to said terminal; and sending said phone information to said telephone.

DETAILED DESCRIPTION

Figure 1:
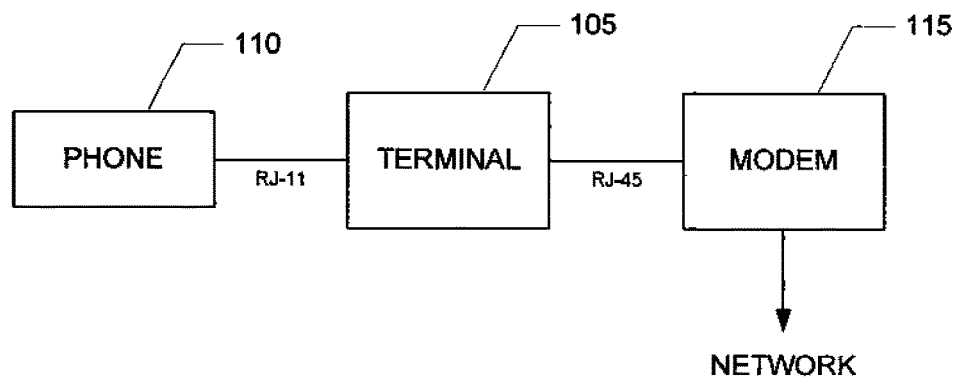
FIG. 1 shows a representation of one implementation of a telephony terminal connected to a telephone and a modem.

The present invention provides methods and apparatus implementing a telephony terminal for connecting a telephone to a data network. In one implementation, the terminal is connected to a typical analog telephone and is connected to a broadband modem. The broadband modem is in turn connected to a data network, such as the Internet. The terminal provides an interface between the telephone and the broadband modem so that the telephone can send and receive voice information through the data network and can access data services through the data network. In another implementation, the terminal is connected to the data network through a wireless connection.

Two illustrative examples of implementations are described below. Additional variations are described after these examples.

In one example of one implementation, a terminal is connected to a telephone, a laptop computer, and a wireless network. The telephone is a typical analog DTMF (dial tone multiple frequency) phone. The terminal is connected to the telephone through a USB port of the terminal, a USB/RJ-11 converter box, and an RJ-11 connection of the telephone. The USB/RJ-11 converter box supports PC to PC, PC to phone, and phone to PC dialing capabilities. The terminal is connected to the laptop computer through a second USB port of the terminal and a USB port of the laptop computer. The terminal includes a wireless modem, radio interface, and antenna for communicating with the wireless network, such as through a CDMA 1×EV-DV air interface.

When a user places a call through the telephone, the telephone passes voice information to the terminal through the USB/RJ-11 converter box. The terminal processes the voice information to generate a signal carrying the voice information. The signal is compatible with the wireless network and the terminal sends the signal to the wireless network through the wireless connection. The wireless network passes the information to the PSTN. The PSTN routes the voice signal to the recipient. In this way, the user places a call through the wireless network using a typical analog telephone and an RJ-11 connection. The terminal provides the processing to complete a full duplex call.

When the user sends data through the laptop computer, the laptop computer passes the data to the terminal through the USB connection. The terminal processes the data to generate appropriate IP data. The terminal generates a signal compatible with the wireless network and sends the data to the wireless network. The wireless network passes the data to the Internet. The Internet routes the data to the recipient. In this way, the user sends data through the wireless network using a laptop and a USB connection.

In this example, a wireless carrier can provide the terminal to consumers. The consumer can connect a typical phone and laptop or other computer to the terminal. Through the functionality of the terminal, the consumer can access high-speed data connection services and also access voice communications services through the wireless network.

In another example of one implementation, a terminal is connected to a cordless telephone base unit and a broadband modem. The terminal is connected to the cordless telephone base unit through an RJ-11 connection of the terminal and an RJ-11 connection of the base unit. The terminal is connected to the broadband modem through an RJ-45 connection of the terminal and an RJ-45 connection of the modem.

When a user places a call through the telephone, the cordless handset passes voice information to the base unit and the base unit passes the voice information to the terminal through the RJ-11 connection. The terminal processes the voice information using a VoIP application to generate IP data carrying the voice information. The terminal sends the data to the broadband modem. The modem passes the data to the Internet. The Internet routes the data to a VoIP gateway. The gateway converts the data to a voice signal and passes the voice signal to the PSTN. The PSTN routes the voice signal to the recipient. In this way, the user places a call through the Internet using a typical cordless phone and an RJ-11 connection.

FIG. 1 shows a representation of one implementation of a telephony terminal 105 connected to a telephone 110 and a modem 115. The terminal 105 is connected to the telephone 110 through an RJ-11 connection. In another implementation, the terminal is connected to the telephone through a different type of connection. For example, in one implementation, the terminal is connected to the telephone through a USB connection of the terminal, a USB/RJ-11 converter, and an RJ-11 connection of the telephone. In another implementation, the terminal is also connected to the telephone through an additional control line.

The telephone 110 is a typical analog telephone. In another implementation, the telephone is a typical cordless telephone or a digital phone. In another implementation, the telephone is a wireless handset with a wireless connection to abuse unit connected to the terminal. In another implementation, the telephone is integrated within the terminal (e.g., the base unit of a cordless telephone is integrated within the terminal and communicates with a cordless handset). In an alternative implementation, instead of or in addition to the telephone, the terminal is connected to a computer system.

The terminal 105 is connected to the modem 115 through an RJ-45 connection. In another implementation, the terminal is connected to the modem through a different type of connection, such as a USB connection. In another implementation, the terminal provides a wireless connection to either or both of the telephone and the modem, such as through a wireless LAN (or Wi-Fi) connection.

The modem 115 is a typical broadband modem, such as a DSL or cable modem. The modem 115 is connected to a data network (directly or through appropriate intervening networks), such as the Internet or a private data network (e.g., a corporate intranet). In another implementation, the modem is an analog modem connected to the PSTN. In another implementation, the modem is integrated within the terminal and the terminal is connected directly to the data network.

Figure 2:
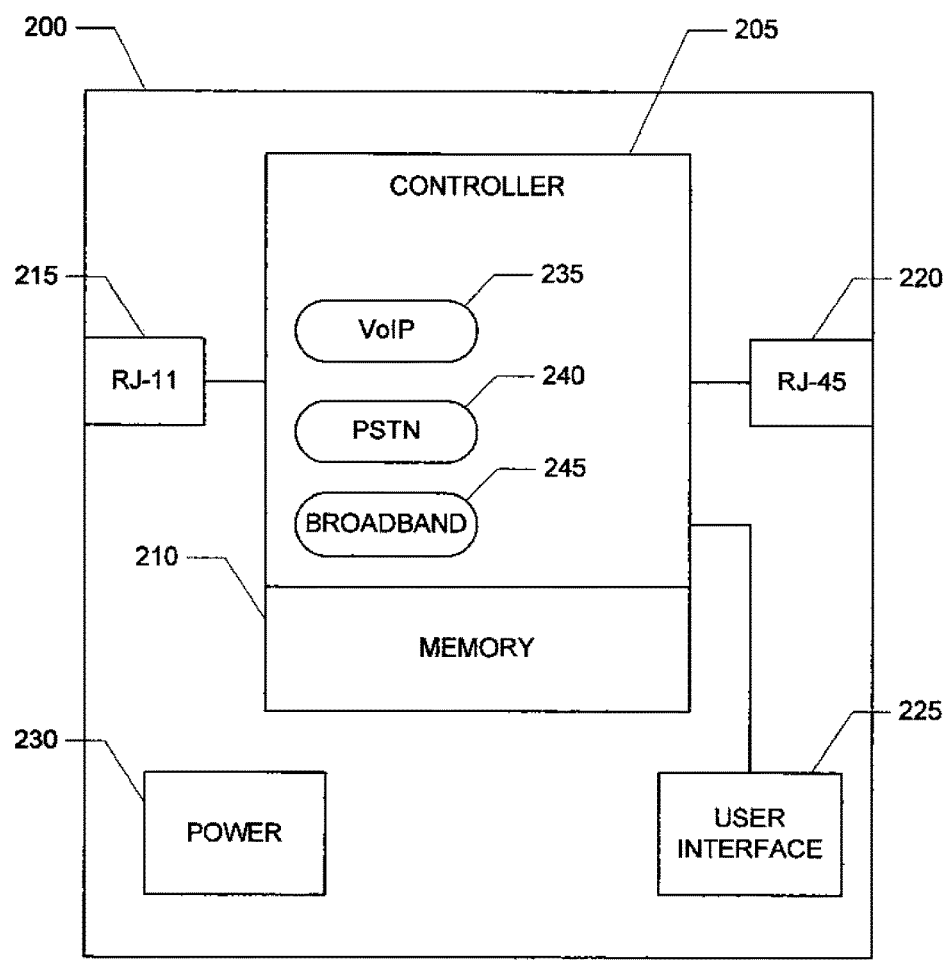
FIG. 2 shows a block diagram of one implementation of a telephony terminal.

FIG. 2 shows a block diagram of one implementation of a telephony terminal 200, such as the terminal 105 shown in FIG. 1. The terminal 200 includes a controller 205 and connected memory 210. The terminal 200 includes an RJ-11 connection 215 connected to the controller 205 and an RJ-45 connection 220 connected to the controller 205. In another implementation, either or both of the RJ-11 connection and the RJ-45 connection are replaced with different types of connections, such as a USB connection, IEEE 802.3 Ethernet, IEEE 1394, or a personal wireless connection (e.g., Bluetooth) among others. The terminal 200 also includes a user interface 225 connected to the controller 205 (e.g., including a keypad and a display). The terminal 200 includes a power source 230 (the connections between the power source 230 and the other components of the terminal 200 are omitted for clarity).

The controller 205 controls the operation of the terminal 200 and provides applications supporting the functionality and services of the terminal 200. In FIG. 2, three services provided by the controller 205 are represented by rounded boxes shown within the controller 205, including: a VoIP service 235, a PSTN service 240, and a broadband service 245. The VoIP service 235 supports VoIP, such as by converting a voice signal to voice data stored in one or more IP packets (including appropriate routing information) and converting one or more IP packets storing voice data to a voice signal. The PSTN service 240 provides a PSTN driver for processing information received from and to be sent to a telephone (e.g., the telephone 110 in FIG. 1) connected to the RJ-11 connection 215. The broadband service 245 provides a broadband driver for processing data received from and to be sent to a broadband modem (e.g., the modem 115 in FIG. 1) connected to the RJ-45 connection 220.

Figure 3:
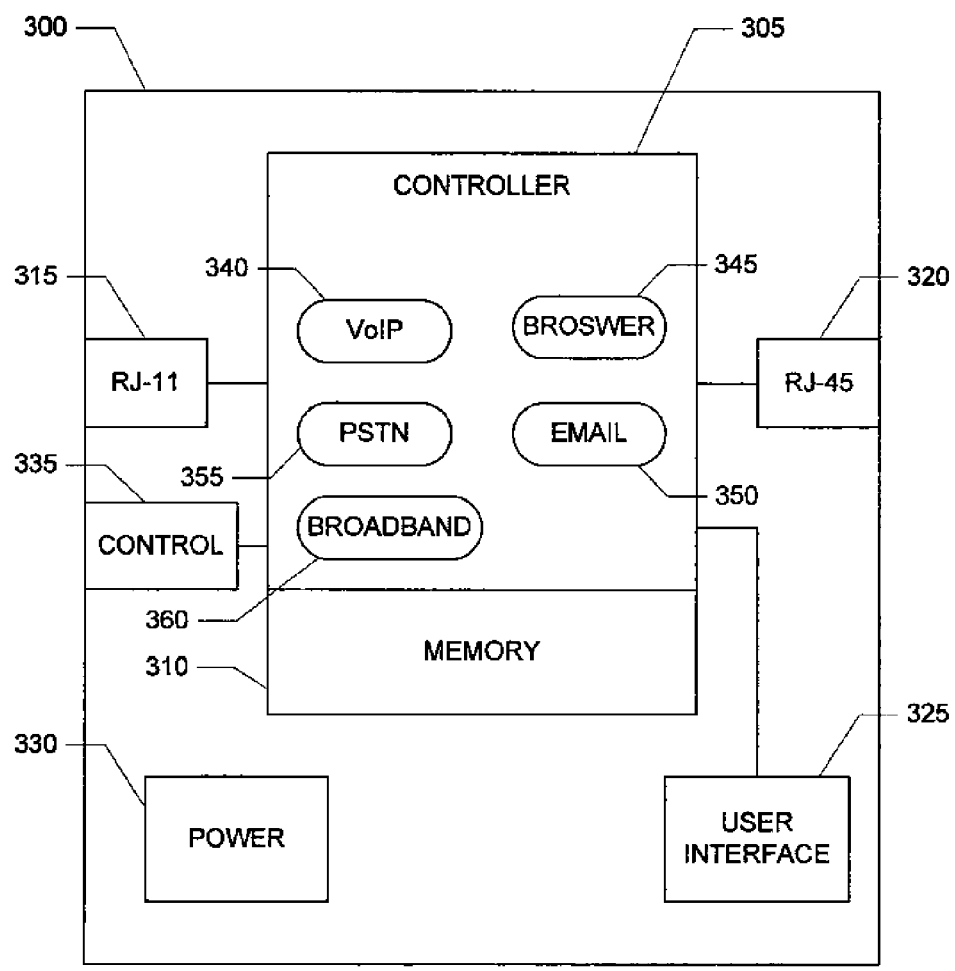
FIG. 3 shows a block diagram of one implementation of a telephony terminal including a control connection for advanced services.

FIG. 3 shows a block diagram of one implementation of a telephony terminal 300 including a control connection for advanced services. Similar to the terminal 200 shown in FIG. 2, the terminal 300 includes a controller 305 and connected memory 310, an RJ-11 connection 315, an RJ-45 connection 320, a user interface 325, and a power source 330. The terminal 300 also includes a control connection 335 for sending and receiving control signals to a telephone connected to the RJ-11 connection 315 and the control connection 335. The terminal 300 uses the control signals for providing advanced services through the controller 305.

Similar to the controller 205 shown in FIG. 2, the controller 305 controls the operation of the terminal 300 and provides applications supporting the functionality and services of the terminal 300. In FIG. 3, five services provided by the controller 305 are represented by rounded boxes shown within the controller 305, including: a VoIP service 340, a browser service 345, an e-mail service 350, a PSTN service 355, and a broadband service 360. The basic services of the VoIP service 340, PSTN service 355, and broadband service 360 are similar to the corresponding services of the controller 205, as described above.

The controller 305 provides advanced services supported by the connected telephone. The controller 305 uses control signals received and sent through the control connection 335. Advanced services supported by some phones (e.g., some advanced cellular/PCS phones) sometimes employ higher layer protocol stacks that are different from standard data network protocols, such as the Internet protocols often utilized for broadband services. For example, some data services supported by some phones operate differently on the phone in comparison to a similar data service operating on a standard desktop computer system. Accordingly, the controller 305 provides advanced services to provide run-time translations between different but functionally similar protocol stacks or to act as gateway nodes for different services. In FIG. 3, the advanced services include the browser service 345 and the e-mail service 350. The browser service 345 provides a browser translator to support an interface between the protocol of the browser software of a connected telephone and the browser protocol of the data network. The e-mail service 350 provides an e-mail gateway to support an interface between the e-mail service of the connected telephone and the e-mail service of the data network. In other implementations, additional or different services are supported (where the terminal includes appropriate additional hardware to support the additional services), such as G3 fax conversions, voicemail boxes and TAD aggregation, cellular/PCS terminal provisioning, PIM information management, handset data backup, or precision differential GPS positioning.

Figure 4:
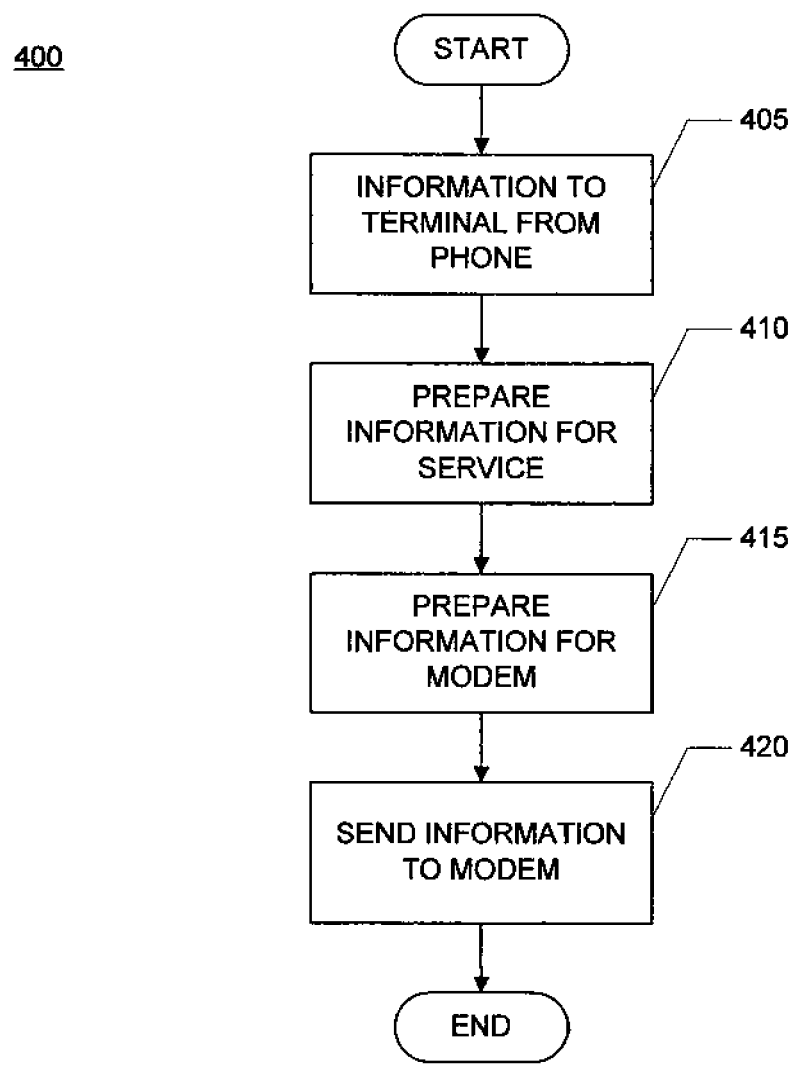
FIG. 4 is a flow chart of one implementation of sending information from a telephone to a modem through a telephony terminal.

FIG. 4 is a flow chart 400 of one implementation of sending information from a telephone to a modem through a telephony terminal. Initially, a terminal is connected to a telephone (e.g., through an RJ-11 connection) and to a modem (e.g., through an RJ-45 connection), such as in the configuration shown in FIG. 1. The telephone sends information to the terminal, block 405. The information indicates a service to be provided by the terminal and the information reflects the requested service. For example, for a voice service, such as VoIP, the telephone sends voice information to the terminal including header information indicating the requested voice service. For a data service, such as a request to access a website through a browser, the telephone sends data to the terminal including header information indicating the requested data service. In an implementation supporting advanced services, the telephone sends additional control information to the terminal through a control connection. In another implementation, the terminal is connected to the phone through a USB/RJ-11 converter. In this case, the USB/RJ-11 converter converts the information sent from the RJ-11 connection of the telephone to data according to the USB protocol and sends the data to the USB connection of the terminal.

The terminal prepares the information from the telephone according to the requested service, block 410. The terminal uses an appropriate service to prepare the information (e.g., using one of the services shown in FIG. 2 or FIG. 3). For example, for VoIP service, the terminal converts the voice information to digital data and stores the digital voice data in IP packets with appropriate routing data. The terminal prepares the resulting information for transmission to the modem, block 415. In one implementation, the modem is a broadband modem and the terminal uses a broadband service to prepare the information for the broadband modem.

The terminal sends the information to the connected modem, block 420. The modem processes the received information and sends the information to a connected data network, such as the Internet.

In another implementation, a computer system is connected to the terminal instead of or in addition to a telephone. The computer system sends data to the modem in a similar way to that described above referring to FIG. 4. If the data provided by the computer system to the terminal is already in an appropriate format for the requested service, the terminal does not adjust the received data (skipping block 410).

Figure 5:
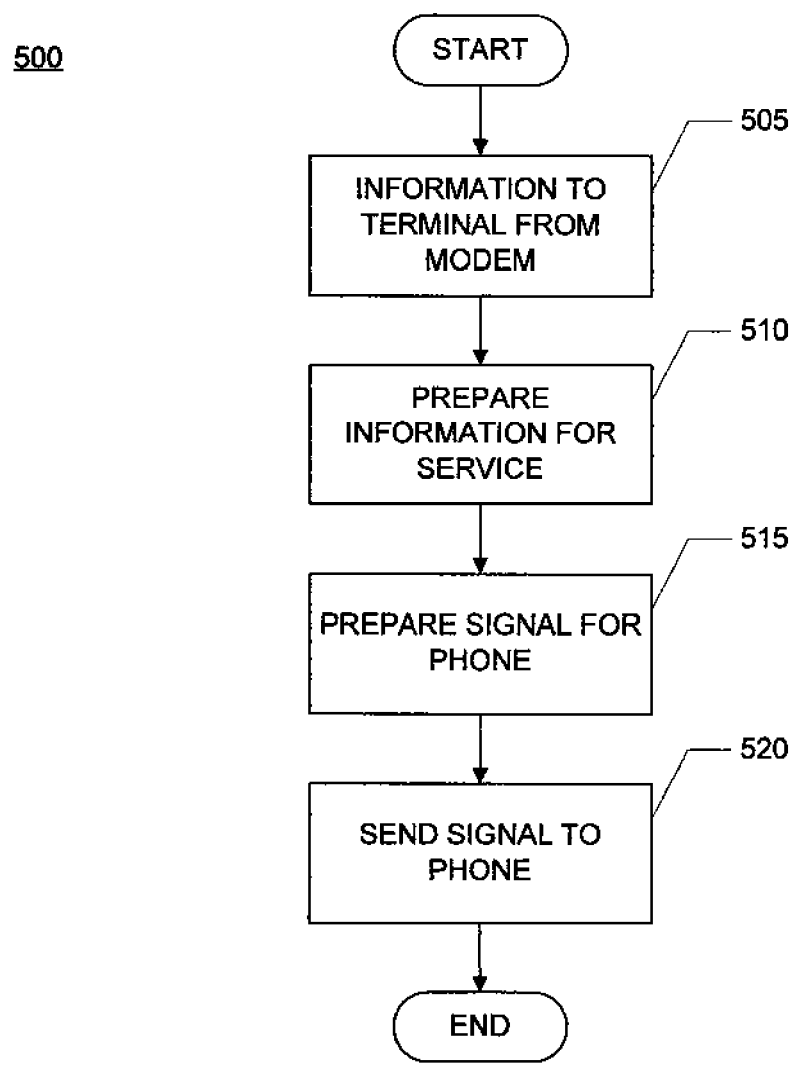
FIG. 5 shows a flow chart of one implementation of sending data from a modem to a telephone through a telephony terminal.

FIG. 5 shows a flow chart 500 of one implementation of sending data from a modem to a telephone through a telephony terminal. Initially, the terminal is connected to a telephone (e.g., through an RJ-11 connection) and to a modem (e.g., through an RJ-45 connection), such as in the configuration shown in FIG. 1. The modem sends information to the terminal, block 505. The information indicates a service to be provided by the terminal and the information reflects the requested service. For example, for a voice service, such as VoIP, the modem sends voice information to the terminal including header information indicating the requested voice service (e.g., as IP packets). For a data service, such as returning data from a website for a browser, the modem sends data to the terminal including header information indicating the requested data service.

The terminal prepares the information from the modem according to the requested service, block 510. The terminal uses an appropriate service to prepare the information (e.g., using one of the services shown in FIG. 2 or FIG. 3). For example, for VoIP service, the terminal converts voice data in packets to voice information for the telephone. The terminal prepares the resulting information for transmission to the telephone, block 515. In one implementation, the telephone is a PSTN-compatible telephone and the terminal uses a PSTN service to prepare a signal carrying the information for the telephone.

In an implementation supporting advanced services, the terminal sends additional control information to the telephone through a control connection. In another implementation, the terminal is connected to the phone through a USB/RJ-11 converter. In this case, the USB/RJ-11 converter converts the information sent from the USB connection of the terminal to a signal according to the protocol of the telephone connection and sends the signal to the telephone.

The terminal sends the information to the connected telephone, block 520. The telephone processes the received information according to the requested service. For voice, the telephone provides the voice as audio output to a user of the telephone. For data, the telephone presents the data to the user through the user interface of the telephone (e.g., through a speaker or display).

In another implementation, a computer system is connected to the terminal instead of or in addition to a telephone. The computer system receives data from the modem in a similar way to that described above referring to FIG. 5. If the data provided by the modem to the terminal is already in an appropriate format for the requested service, the terminal does not adjust the received data (skipping block 510).

Figure 6:
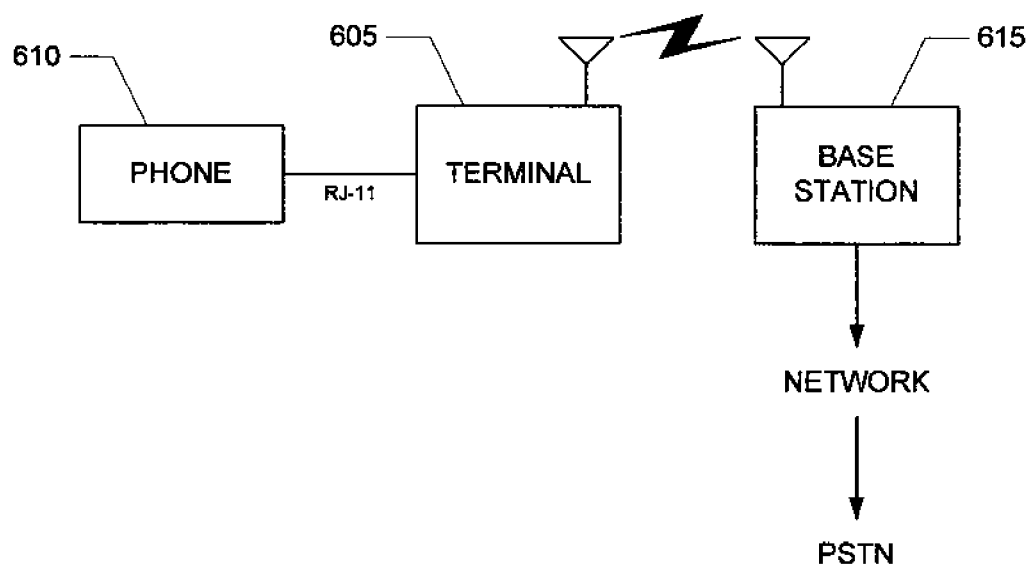
FIG. 6 shows a representation of one implementation of a telephony terminal connected to a telephone and a base station.

FIG. 6 shows a representation of one implementation of a telephony terminal 605 connected to a telephone 610 and a base station 615. The terminal 605 is connected to the telephone 610 through an RJ-11 connection. In another implementation, the terminal is connected to the telephone through a different type of connection. For example, in one implementation, the terminal is connected to the telephone through a USB connection of the terminal, a USB/RJ-11 converter, and an RJ-11 connection of the telephone. In another implementation, the telephone is connected to the terminal through a wireless connection. In another implementation, the terminal is also connected to the telephone through an additional control line.

The telephone 610 is a typical analog telephone. In another implementation, the telephone is a typical cordless telephone. In another implementation, the telephone is a wireless handset with a wireless connection to a base unit connected to the terminal. In another implementation, the telephone is integrated within the terminal (e.g., the base unit of a cordless telephone is integrated within the terminal and communicates with a cordless handset). In an alternative implementation, instead of or in addition to the telephone, the terminal is connected to a computer system.

The terminal 605 is connected to the base station 615 through a wireless connection. In one implementation, the wireless connection is a wide-area wireless connection such as a cellular or PCS connection. For example, the wireless connection can be a CDMA, GSM, or TDMA connection, or a wireless LAN (or Wi-Fi) connection, among others. In another implementation, the wireless connection is a local wireless connection.

The base station 615 is a typical wireless base station. The base station 615 is connected to a wireless network. The wireless network provides a data network or is connected to a data network, such as the Internet or a private data network (e.g., a corporate intranet). In one implementation, the wireless network is also connected to the PSTN. In another implementation, the terminal is connected directly to the PSTN.

Figure 7:
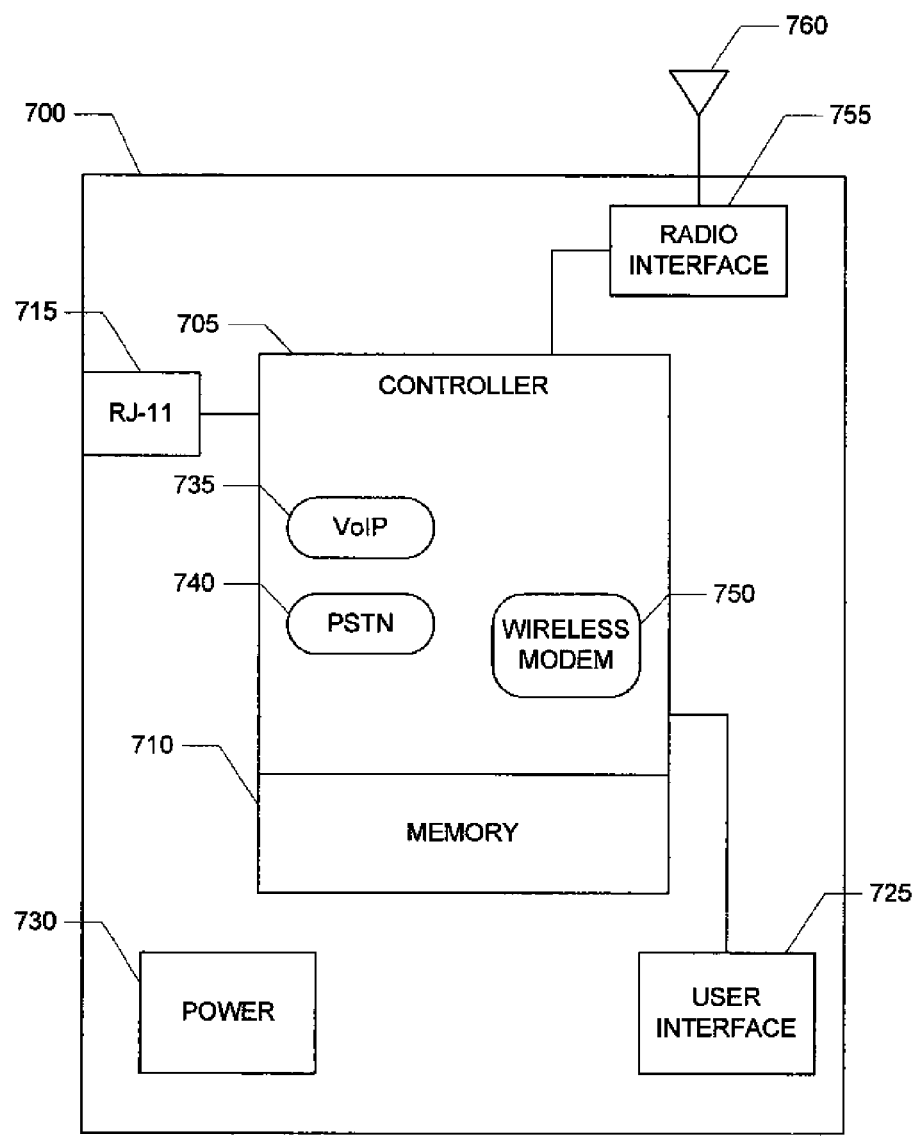
FIG. 7 shows a block diagram of one implementation of a terminal including a radio interface and an antenna.

FIG. 7 shows a block diagram of one implementation of a terminal 700 including a radio interface and an antenna. The terminal 700 is similar to the terminal 200 shown in FIG. 2, and similar components operate in a similar way. Accordingly, the terminal 700 includes a controller 705 and connected memory 710, an RJ-11 connection 715, a user interface 725, and a power source 730. The controller 705 provides a VoIP service 735 and a PSTN service 740. In an alternative implementation, the controller also provides a broadband service and the terminal includes an RJ-45 connection similar to the terminal 200.

The terminal 700 supports a wireless connection to a base station (e.g. the base station 615 shown in FIG. 6) through a wireless modem service 750 of the controller 705, a radio interface 755 connected to the controller 705, and an antenna 760 connected to the radio interface 755. The wireless modem service 750, radio interface 755, and antenna 760, are configured to support the air interface of the wireless connection. The wireless modem service 750 provides support for sending and receiving signals through a wireless air interface, such as a CDMA interface. In one implementation, the wireless modem service is a hardware subsystem of the controller or alternatively is a separate subsystem or component of the terminal connected to the controller. In one implementation, the radio interface 755 is a typical radio interface supporting the air interface of the wireless modem service 750 and includes: radio frequency (RF) components, a duplexer, a low noise amplifier (LNA), a bandpass filter (BPF), an isolator, and a power amplifier. The radio interface 755 operates similarly to typical radio interfaces in wireless handsets or terminals supporting the air interface of the wireless modem service 750. For sending signals, the wireless modem service 750 provides modulated signals to the radio interface 755 and on to the antenna 760. For receiving signals, the antenna 760 provides a signal received from the wireless connection to the radio interface 755 and on to the wireless modem service 750.

In another implementation, the terminal provides a wireless voice service. In this case, the terminal provides voice information from a connected telephone to the wireless network, such as to be passed to the PSTN. This wireless voice service is similar to a fixed wireless service provided by a wireless local loop terminal.

Figure 8:
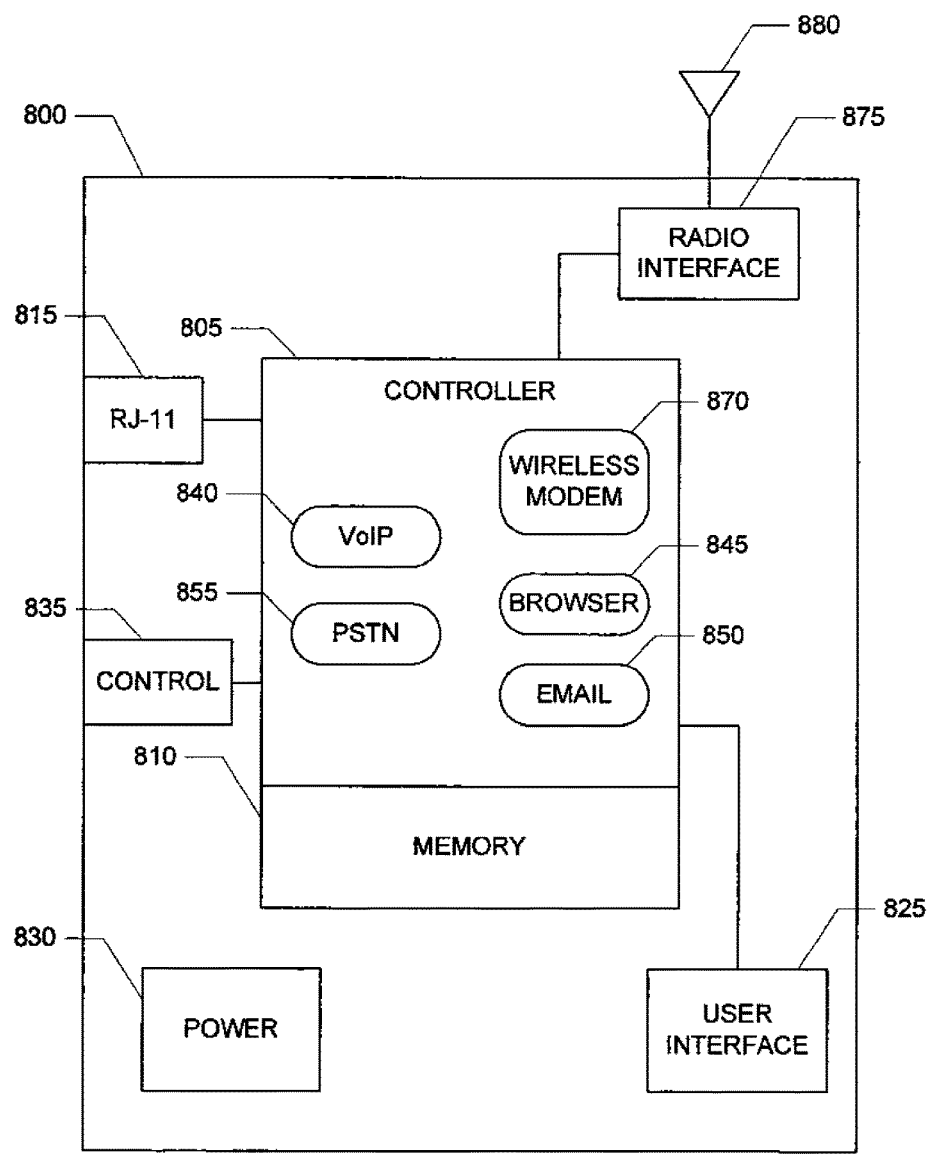
FIG. 8 shows a block paragraph of one implementation of the terminal including a radio interface and antenna and supporting advanced services.

FIG. 8 shows a block diagram of one implementation of the terminal 800 including a radio interface and antenna and supporting advanced services. The terminal 800 is similar to the terminal 700 shown in FIG. 7 and the terminal 300 shown in FIG. 3, and similar components operate in a similar way. Accordingly, the terminal 800 includes a controller 805 and connected memory 810, an RJ-11 connection 815, a user interface 825, a power source 830, and a control connection 835. The controller 805 provides a VoIP service 840, a browser service 845, an e-mail service 850, a PSTN service 855, and a wireless modem service 870. The terminal 800 also includes a radio interface 875 connected to the controller 805 and an antenna 880 connected to the radio interface 875. In an alternative implementation, the controller also provides a broadband service and the terminal includes an RJ-45 connection similar to the terminal 300.

The terminal 800 supports a wireless connection in a similar way to the terminal 700, as described above. The terminal 800 supports advanced services in a similar way to the terminal 300, as described above.

Figure 9:
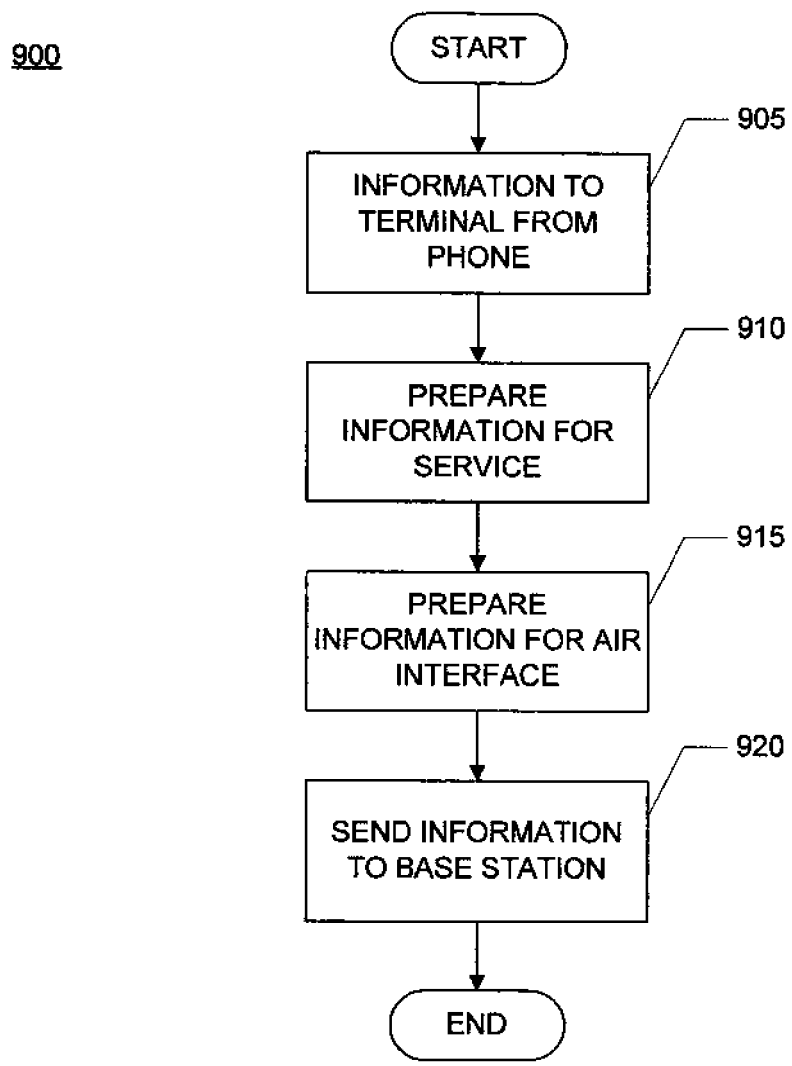
FIG. 9 shows a flow chart of one implementation of sending data from a phone to a data network through a telephony terminal and a wireless connection.

FIG. 9 shows a flow chart 900 of one implementation of sending data from a phone to a data network through a telephony terminal and a wireless connection. Initially, a terminal is connected to a telephone (e.g., through an RJ-11 connection) and to a base station through a wireless connection (e.g., through a CDMA connection), such as in the configuration shown in FIG. 6. The telephone sends information to the terminal, block 905. The information indicates a service to be provided by the terminal and the information reflects the requested service. For example, for a voice service, such as VoIP, the telephone sends voice information to the terminal including header information indicating the requested voice service. For a data service, such as a request to access a website through a browser, the telephone sends data to the terminal including header information indicating the requested data service. In an implementation supporting advanced services, the telephone sends additional control information to the terminal through a control connection. In another implementation, the terminal is connected to the phone through a USB/RJ-11 converter. In this case, the USB/RJ-11 converter converts the information sent from the RJ-11 connection of the telephone to data according to the USB protocol and sends the data to the USB connection of the terminal.

The terminal prepares the information from the telephone according to the requested service, block 910. The terminal uses an appropriate service to prepare the information (e.g., using one of the services shown in FIG. 7 or FIG. 8). For example, for VoIP service, the terminal converts the voice information to digital data and stores the digital voice data in IP packets with appropriate routing data. The terminal prepares the resulting information for transmission to the base station, block 915. The terminal uses the wireless modem service of the controller to prepare the information according to the air interface of the wireless modem service.

The terminal sends the information to the base station through the wireless connection, block 920. The base station processes the received information and sends the information to the wireless network and on to a connected data network, such as the Internet.

In another implementation, a computer system is connected to the terminal instead of or in addition to a telephone. The computer system sends data to the modem in a similar way to that described above referring to FIG. 9. If the data provided by the computer system to the terminal is already in an appropriate format for the requested service, the terminal does not adjust the received data (skipping block 910).

Figure 10:
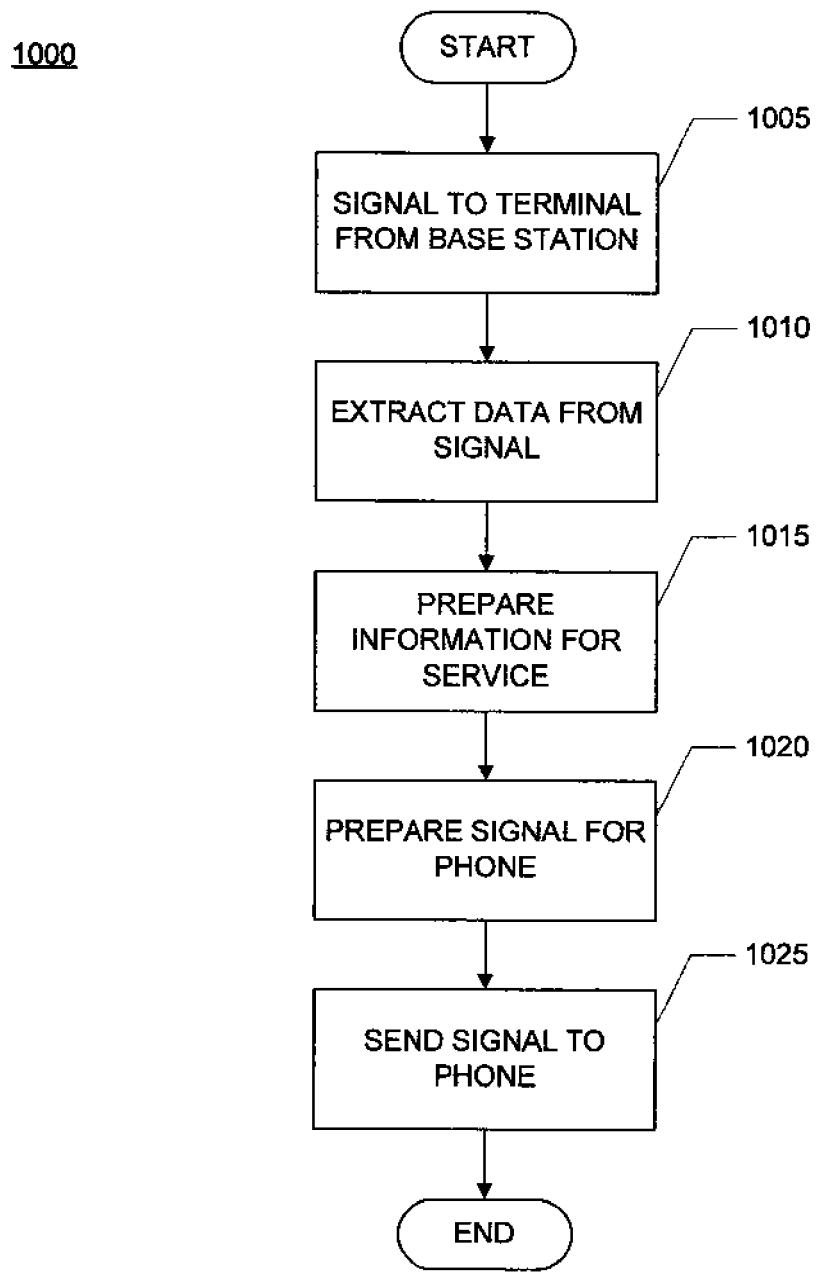
FIG. 10 shows a flow chart of one implementation of sending data from a base station to a telephone through a telephony terminal and a wireless connection.

FIG. 10 shows a flow chart 1000 of one implementation of sending data from a base station to a telephone through a telephony terminal and a wireless connection. Initially, the terminal is connected to a telephone (e.g., through an RJ-11 connection) and to a base station through a wireless connection, such as in the configuration shown in FIG. 6. The base station sends information to the terminal, block 1005. The information indicates a service to be provided by the terminal and the information reflects the requested service. For example, for a voice service, such as VoIP, the base station sends voice information to the terminal including header information indicating the requested voice (e.g., as IP packets in a wireless signal). For a data service, such as returning data from a website for a browser, the base station sends data to the terminal including header information indicating the requested data service. The terminal receives the signal from the base station and extracts the information from the signal, block 1010. The terminal uses the wireless modem service of the controller to process and extract the information according to the air interface of the wireless modem service.

The terminal prepares the information from the base station according to the requested service, block 1015. The terminal uses an appropriate service to prepare the information (e.g., using one of the services shown in FIG. 7 or FIG. 8). For example, for VoIP service, the terminal converts voice data to voice information for the telephone. The terminal prepares the resulting information for transmission to the telephone, block 1020. In one implementation, the telephone is a PSTN-compatible telephone and the terminal uses a PSTN service to prepare a signal carrying the information for the telephone.

The terminal sends the information to the connected telephone, block 1025. The telephone processes the received information according to the requested service. For voice, the telephone provides the voice as audio output to a user of the telephone. For data, the telephone presents the data to the user through the user interface of the telephone (e.g., a speaker or display).

In an implementation supporting advanced services, the terminal sends additional control information to the telephone through a control connection. In another implementation, the terminal is connected to the phone through a USB/RJ-11 converter. In this case, the USB/RJ-11 converter converts the information sent from the USB connection of the terminal to a signal according to the protocol of the telephone connection and sends the signal to the telephone.

In another implementation, a computer system is connected to the terminal instead of or in addition to a telephone. The computer system receives data from the base station with in a similar way to that described above referring to FIG. 10. If the data provided by the modem to the terminal is already in an appropriate format for the requested service, the terminal does not adjust the received data (skipping block 1015).

Figure 11:
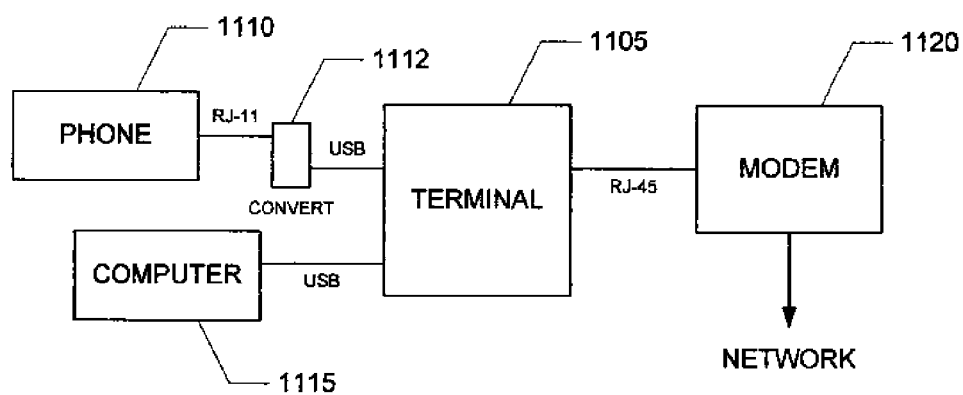
FIG. 11 shows a representation of one implementation of a telephony terminal connected to a telephone, a computer system, and a modem.

FIG. 11 shows a representation of one implementation of a telephony terminal 1105 connected to a telephone 1110, a computer system 1115, and a modem 1120. The terminal 1105 is connected to the telephone 1110 through a USB connection of the terminal 1105, a USB/RJ-11 converter 1112, and an RJ-11 connection of the telephone 1110. In another implementation, the terminal is connected to the telephone through a different type of connection. For example, in one implementation, the terminal is connected to the telephone through an RJ-11 connection. In another implementation, the terminal is also connected to the telephone through an additional control line.

The telephone 1110 is a typical analog telephone. In another implementation, the telephone is a typical cordless telephone. In another implementation, the telephone is a wireless handset with a wireless connection to a base unit connected to the terminal. In another implementation, the telephone is integrated within the terminal (e.g., the base unit of a cordless telephone is integrated within the terminal and communicates with a cordless handset).

The terminal 1105 is connected to the computer system 1115 through a USB connection. In another implementation, the terminal is connected to the computer system through a different type of connection, such as an RJ-45 connection.

The computer system 1115 is a typical desktop or laptop computer. In another implementation, the computer system is a device including a programmable processor and related components for providing the functionality of a computer system, such as a PDA or a consumer electronics device. In another implementation, the computer system is integrated within the terminal.

The terminal 1105 is connected to the modem 1120 through an RJ-45 connection. In another implementation, the terminal is connected to the modem through a different type of connection, such as a USB connection. In another implementation, the terminal provides a wireless connection to any or all of the telephone, the computer system, and the modem, such as through a wireless LAN (or Wi-Fi) connection.

The modem 1120 is a typical broadband modem, such as a DSL or cable modem. The modem 1120 is connected to a data network (directly or through appropriate intervening networks), such as the Internet or a private data network (e.g., a corporate intranet). In another implementation, the modem is an analog modem connected to the PSTN. In another implementation, the modem is integrated within the terminal and the terminal is connected directly to the data network.

The telephone 1110 and computer system 1115 can send and receive signals and data through the terminal 1105 in a similar way to the process described above in FIGS. 4 and 5.

Figure 12:
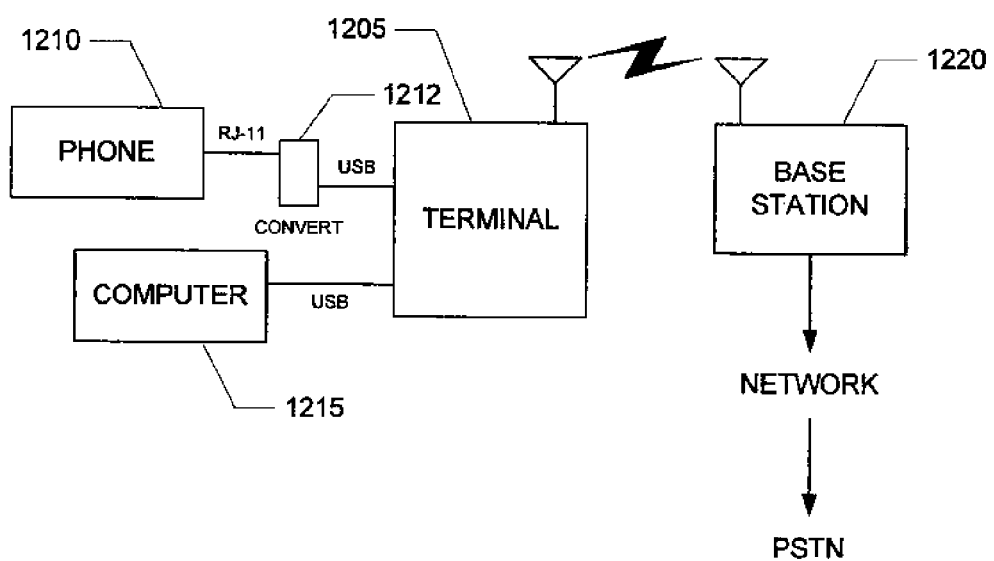
FIG. 12 shows a representation of one implementation of a telephony terminal connected to a telephone, a computer system, and a base station.

FIG. 12 shows a representation of one implementation of a telephony terminal 1205 connected to a telephone 1210, a computer system 1215, and a base station 1220. The terminal 1205 is connected to the telephone 1210 through a USB connection of the terminal 1205, a USB/RJ-11 converter 1212, and an RJ-11 connection of the telephone 1210. In another implementation, the terminal is connected to the telephone through a different type of connection. For example, in one implementation, the terminal is connected to the telephone through an RJ-11 connection. In another implementation, the telephone is connected to the terminal through a wireless connection. In another implementation, the terminal is also connected to the telephone through an additional control line.

The telephone 1210 is a typical analog telephone. In another implementation, the telephone is a typical cordless telephone. In another implementation, the telephone is a wireless handset with a wireless connection to a base unit connected to the terminal. In another implementation, the telephone is integrated within the terminal (e.g., the base unit of a cordless telephone is integrated within the terminal and communicates with a cordless handset).

The terminal 1205 is connected to the computer system 1215 through a USB connection. In another implementation, the terminal is connected to the computer system through a different type of connection, such as an RJ-45 connection.

The computer system 1215 is a typical desktop or laptop computer. In another implementation, the computer system is a device including a programmable processor and related components for providing the functionality of a computer system, such as a PDA or a consumer electronics device. In another implementation, the computer system is integrated within the terminal.

The terminal 1205 is connected to the base station 1220 through a wireless connection. In one implementation, the wireless connection is a wide-area wireless connection such as a cellular or PCS connection. For example, the wireless connection can be a CDMA, GSM, or TDMA connection, or a wireless LAN (or Wi-Fi) connection, among others. In another implementation, the wireless connection is a local wireless connection.

The base station 1220 is atypical wireless base station. The base station 1220 is connected to a wireless network. The wireless network provides a data network or is connected to a data network, such as the Internet or a private data network (e.g., a corporate intranet). In one implementation, the wireless network is also connected to the PSTN. In another implementation, the terminal is connected directly to the PSTN.

The telephone 1210 and computer system 1215 can send and receive signals and data through the terminal 1205 and wireless connection in a similar way to the process described above in FIGS. 9 and 10.

Figure 13:
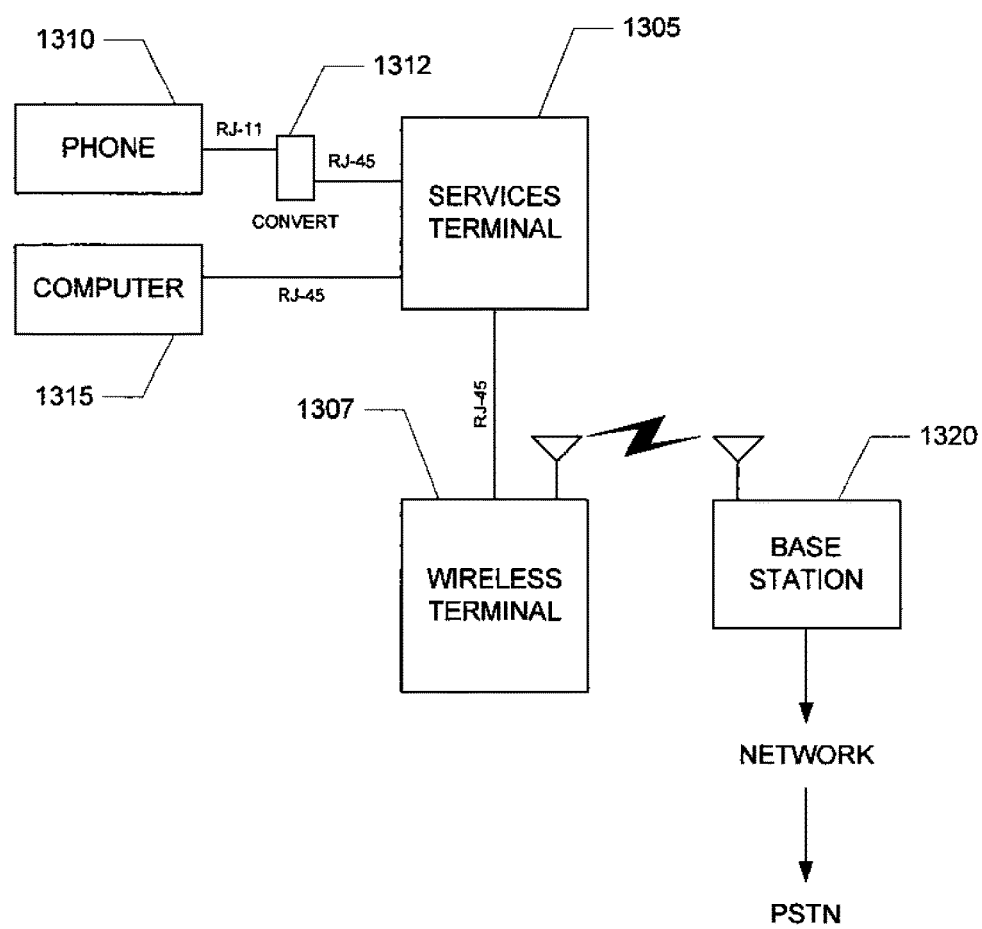
FIG. 13 shows a representation of one implementation of a telephony services terminal connected to a wireless terminal, a telephone, a computer system, and a base station.

FIG. 13 shows a representation of one implementation of a telephony services terminal 1305 connected to a wireless terminal 1307, a telephone 1310, a computer system 1315, and a base station 1320. The services terminal 1305 and the wireless terminal 1307 together provide the functionality of the telephony terminal 1205 in FIG. 12, but as separate devices. In one implementation, the services terminal 1305 includes the components and services of the terminal 200 in FIG. 2 or terminal 300 in FIG. 3.

The services terminal 1305 is connected to the wireless terminal 1307 through an RJ-45 connection. In another implementation, the services terminal is connected to the wireless terminal through a different type of connection, such as a USB or wireless connection.

The wireless terminal 1307 includes a subset of the components and services of the terminal 700 in FIG. 7 or the terminal 800 in FIG. 8. For example, in one implementation, the wireless terminal includes (referring to the components and services shown in FIG. 8): a controller 805 and connected memory 810, a user interface 825, a power source 830, a control connection 835, a wireless modem service 870, a radio interface 875, and an antenna 880. Instead of an RJ-11 connection, the wireless terminal includes an RJ-45 connection to connect to the services terminal. In another implementation, the wireless terminal also provides a broadband or network service to process data received from and to be sent to the services terminal.

The services terminal 1305 is connected to the telephone 1310 through an RJ-45 connection of the services terminal 1305, a RJ-45/RJ-11 converter 1312, and an RJ-11 connection of the telephone 1310. In another implementation, the services terminal is connected to the telephone through a different type of connection. For example, in one implementation, the services terminal is connected to the telephone through an RJ-11 connection or through a USB connection and an USB/RJ-11 converter. In another implementation, the telephone is connected to the services terminal through a wireless connection. In another implementation, the services terminal is also connected to the telephone through an additional control line.

The telephone 1310 is a typical analog telephone. In another implementation, the telephone is a typical cordless telephone. In another implementation, the telephone is a wireless handset with a wireless connection to a base unit connected to the services terminal. In another implementation, the telephone is integrated within the services terminal (e.g., the base unit of a cordless telephone is integrated within the terminal and communicates with a cordless handset).

The services terminal 1305 is connected to the computer system 1315 through an RJ-45 connection. In another implementation, the services terminal is connected to the computer system through a different type of connection, such as a USB connection.

The computer system 1315 is a typical desktop or laptop computer. In another implementation, the computer system is a device including a programmable processor and related components for providing the functionality of a computer system, such as a PDA, or a consumer electronics device. In another implementation, the computer system is integrated within the services terminal.

The wireless terminal 1307 is connected to the base station 1320 through a wireless connection. In one implementation, the wireless connection is a wide-area wireless connection such as a cellular or PCS connection. For example, the wireless connection can be a CDMA, GSM, or TDMA connection, or a wireless LAN (or Wi-Fi) connection, among others. In another implementation, the wireless connection is a local wireless connection.

The base station 1320 is a typical wireless base station. The base station 1320 is connected to a wireless network. The wireless network provides a data network or is connected to a data network, such as the Internet or a private data network (e.g., a corporate intranet). In one implementation, the wireless network is also connected to the PSTN. In another implementation, the services terminal or the wireless terminal is connected directly to the PSTN.

The telephone 1310 and computer system 1315 can send and receive signals and data through the services terminal 1305, wireless terminal 1307, and wireless connection in a similar way to the process described above in FIGS. 4, 5, 9, and 10. For example, when sending information from the telephone 1310 to the wireless network, the telephone 1310 provides the information to the services terminal 1305, the services terminal 1305 provides data to the wireless terminal 1307, and the wireless terminal 1307 provides signals to the base station 1320 and on the wireless network. The services terminal 1305 processes the information from the telephone 1310 and outputs the information as data according to the process of FIG. 4. The wireless terminal 1307 processes the data from the services terminal 1305 and outputs the data as a wireless signal according to the latter part of FIG. 9, specifically blocks 915 and 920. In an alternative implementation, the services terminal does not process the information beyond the requested service and provides the data to the wireless terminal in an intermediate form (e.g., skipping block 415).

In this way, the services terminal 1305 provides the requested service (e.g., VoIP, browser translation, e-mail gateway, etc. as described above) and the wireless terminal 1307 provides a wireless connection for communication with the wireless network. Because the services terminal and the wireless terminal are separated into two devices, a service provider (e.g., a wireless carrier company) can provide the services terminal and the wireless terminal separately. For customers who want a wireless connection the service provider provides both terminals, and for customers who do not want a wireless connection the service provider provides only the services terminal.

The various implementations of the invention are realized in electronic hardware, computer software, or combinations of these technologies. Some implementations include one or more computer programs executed by a programmable processor or computer. For example, referring to FIG. 1, in one implementation, the terminal 105 includes one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using telephones, different voice communication devices can be used, such as two-way radios. In another alternative implementation, rather than voice service, the terminal provides data transfer services such as file downloading.

Accordingly, the present invention is not limited to only those implementations described above.

What is claimed is:

1. An apparatus, comprising:
    a network port configured to connect to a network interface that provides access to a data network;
    a controller configured to, in response to receipt of header data from a phone port of the apparatus, initiate a service identified by the header data from a group of services supported by the apparatus, wherein the group of services comprises at least
    a public switched telephone network service configured to process analog telephone data received via the phone port,
    a network voice service configured to convert information to or from a network voice format of the data network and exchanges the information with the network port, and
    a browser service; and
    a user interface configured to display at least a portion of the information.

2. The apparatus of claim 1, wherein the apparatus is a wireless handset device.

3. The apparatus of claim 1, wherein the group of services further comprises an electronic mail service.

4. The apparatus of claim 1, wherein the group of services further comprises a voice over internet protocol service that facilitates processing of voice information and generation of internet protocol data that carries the voice information.

5. The apparatus of claim 1, wherein the controller is further configured to initiate the network voice service in response to receipt of voice information that comprises the header information and a determination that the header information identifies the network voice service.

6. The apparatus of claim 1, wherein the network port is configured to connect to a wireless wide area network that provides access to a plain old telephone service telephone network and to the data network.

7. The apparatus of claim 1, wherein the browser service transfers application information for a browser application between the apparatus and the network interface.

8. The apparatus of claim 1, wherein the group of services further comprises a message service that transfers message data for a message application between the apparatus and the network interface.

9. A method, comprising:
    connecting, by an apparatus comprising a processor, to a network interface that provides access to a data network;
    receiving, by the apparatus via a phone port of the apparatus, information comprising header information that identifies a service of a group of services supported by the apparatus, the group of services comprising at least
    a network voice service,
    a public switched telephone network service configured to process analog telephone information received via the phone port, and
    a browser service;
    in response to determining that the header information identifies the network voice service, converting, by the apparatus the information to or from a network voice format supported by the data network based on the network voice service;
    exchanging the information with the network interface; and
    displaying at least a portion of the information via a display component.

10. The method of claim 9, further comprising executing an electronic mail service.

11. The method of claim 9, wherein the information is voice information, and the method further comprises:
    in response to determining that the header information identifies a voice over internet protocol service,
    processing the voice information in accordance with the voice over internet protocol service, and
    generating internet protocol data that carries the voice information.

12. The method of claim 9, further comprising connecting to a wireless wide area network that provides access to a plain old telephone service telephone network and to the data network.

13. The method of claim 9, further comprising, in response to determining that the header information identifies the browser service, executing the browser service, wherein the executing the browser service comprises transferring application information for a browser application between the apparatus and the network interface.

14. The method of claim 9, further comprising executing a message service that transfers message data for a message application between the apparatus and the network interface.

15. The method of claim 9, wherein the connecting comprises connecting to the network interface using a broadband connection.

16. The method of claim 9, wherein the apparatus is a wireless handheld device.

17. A non-transitory computer-readable medium having stored thereon computer-executable instructions that, in response to execution, cause a mobile device comprising a processor to perform operations, the operations comprising:
    establishing communication with a network interface that provides access to a data network;
    receiving, via a phone port of the mobile device, data that comprises header information, wherein the header information specifies a service of multiple services supported by the mobile device, and the multiple services comprise at least
    a network voice service,
    a public switched telephone network service configured to process analog telephone information from the phone port, and
    a browser service;
    in response to determining that the header information identifies a network voice service, converting the data to or from a network voice format supported by the data network in accordance with the network voice service;
    exchanging the information with the network interface; and
    displaying at least a portion of the data on a display of the mobile device.

18. The non-transitory computer-readable medium of claim 17, wherein the data is voice data, and the operations further comprise:
    in response to determining that the header information identifies a voice over internet protocol service,
        processing the voice information in accordance with the voice over internet protocol service, and
        generating internet protocol data that carries the voice information.

19. The non-transitory computer-readable medium of claim 17, wherein the operations further comprise:
    in response to determining that the header information identifies the browser service, executing the browser service, wherein the executing the browser service comprises transferring application information for a browser application between the mobile device and the network interface.

20. The method of claim 9, further comprising, in response to determining that the header information identifies the public switched telephone network service, executing the public switched telephone network service, wherein the executing the public switched telephone network service comprises processing the analog telephone data for transmission via a network device of a public switched telephone network.

* * * * *